Jan. 16, 1934.  C. B. MIRICK  1,943,329
VISUAL INDICATING RADIOCOMPASS
Original Filed Feb. 19, 1930
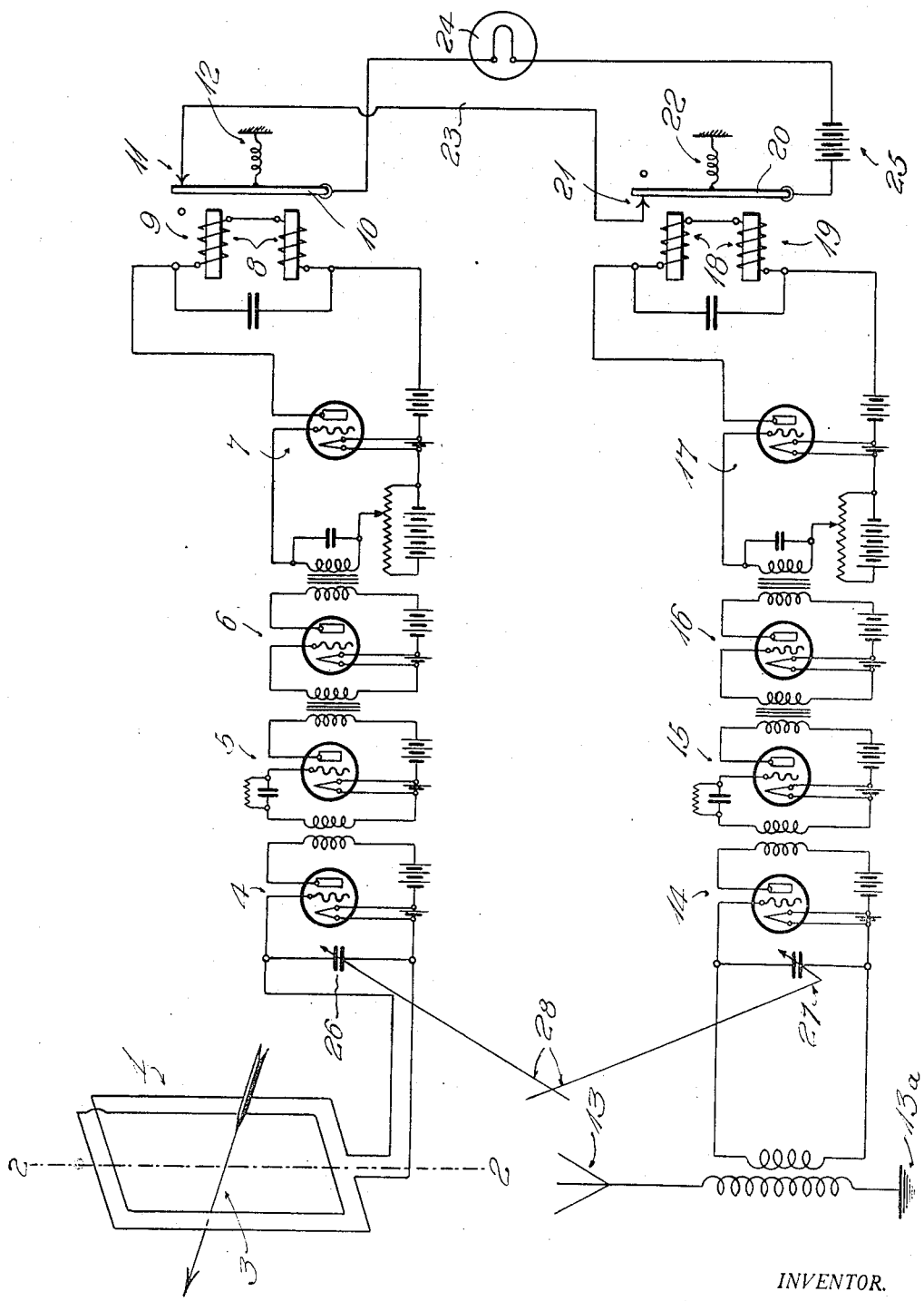
INVENTOR.
Carlos B. Mirick,
BY Harold Dodd
ATTORNEY.

Patented Jan. 16, 1934

1,943,329

UNITED STATES PATENT OFFICE 1,943,329

VISUAL INDICATING RADIOCOMPASS

Carlos B. Mirick, Washington, D. C., assignor to
National Electrical Supply Company, Washington, D. C., a corporation of Virginia Application February 19, 1930, Serial No. 429,702
Renewed April 3, 1933

8 Claims. (Cl. 250—11)

My invention relates broadly to radio compass systems and more particularly to a visually indicating radio compass.

One of the objects of my invention is to provide a circuit arrangement for a visually indicating radio compass system which will give an indication when the bearing of the transmitting station is in line with the axis of the receiving loop.

Another object of my invention is to provide a circuit arrangement for a visually indicating radio compass system wherein a pair of independent receiving channels are arranged to cooperatively actuate a relay circuit at the receiving station for operating an indicating signal for the determination of the line of direction or bearing of the transmitting station.

A further object of my invention is to provide a circuit arrangement for a visually indicating radio compass employing a pair of receiving channels, one of said channels responding directionally to a transmitting station, while the other of said channels responds non-directionally with respect to the transmitting station with a relay circuit operated by the integral effects of the pair of receiving channels for indicating the bearing of the transmitting station.

Still another object of my invention is to provide a circuit arrangement for a visually indicating radio compass system in which the signaling energy is incident upon a non-directional receiving system and simultaneously incident upon a directional antenna system, each of which is connected in common to a multiple relay circuit responsive to signaling energy received by both of the said systems for actuating an indicator.

Other and further objects of my invention reside in the circuit arrangement for a visually indicating radio compass as set forth more fully in the specification hereinafter following by reference to the accompanying drawing which diagrammatically shows the visually indicating radio compass system of my invention.

The purpose of my invention is to provide a visually indicating radio compass system which will give an indication when the bearing of the transmitting station is in line with the axis of the indicating loop. It has been difficult to arrange such a visually indicating system in the past for the reason that the instant when the axis of revolving compass loop points toward the transmitting radio station no signal is received. The axis of the loop herein referred to is normal to the plane of the turns of the loop. A lamp indicator or relay operated device connected to the output of compass receiver will then be in position for zero signal. If, for instance, a lamp operated by a relay is used as the indicating means, the back contacts of the relay would have to be used so that lamp would be lighted with relay open, but, as this is the normal position for no signal there would be no means of determining whether the absence of indication was due to the minimum directional effect of compass loop or to the fact that the station on which bearing was desired had stopped sending.

As a condition precedent for the operation of the indicator in the visual indicating compass system of my invention, I provide a non-directional receiving channel which controls one of the relays of a multiple relay circuit for closing the circuit from a suitable source through a visual indicating device. Then, as the directional antenna system is revolved to bring the axis of the loop in the direction of the antenna system or with the plane of the loop extending normal to the line of direction extending to the distant transmitting station, a relay contact in the multiple relay circuit at the receiver is closed thereby insuring the operation of the indicating device at the receiver so long as the signal is being transmitted as determined by the effects of the signaling energy on the non-directional receiving system. That is to say, in order to place the visual indicating device in condition for operation, an interlock relay must first be actuated under control of the transmitting station which is received non-directionally. Thereafter, changes in position of the axis of the coil antenna result in actuation of a control relay in the multiple relay circuit and a corresponding actuation of a visual indicating device. Operation of the visual indicating device will occur in accordance with the movement of axis of the loop only as long as the transmitting station is in operation as determined by the relay circuit operated by energy incident upon the non-directional antenna system.

Referring to the drawing, reference character 1 designates the directional receiving antenna which is rotatable about center line 2 for determining the bearing of a distant transmitter. The axis of the loop 1 is designated at 3 extending in a direction normal to the plane of the turns of the loop 1. Loop 1 is movable so that the axis 3 may be shifted in different directions toward the transmitting stations. The loop 1 is connected to the input circuit of a receiving channel which I have represented as comprising a radio frequency amplifier 4, a detector 5, and an audio frequency amplifier 6 connected to the input circuit of the tuned vacuum tube relay circuit 7. The winding 8 of relay system 9 connects in the output circuit of the vacuum tube relay 7. The movable armature 10 of relay 9 has a back contact 11 with which the armature 10 is normally maintained in contact by the action of spring 12 when the relay winding 8 is not energized. As the loop 1 is revolved with respect to an incoming signal, maximum and minimum signal will be received and the relay armature 10 will shift from one position opening contact 11 to the non-energized position illustrated which shows the contact closed. The second signal receiving channel includes antenna 13 and ground connection 13a, providing a non-directional receiving system connected to the input circuit of radio frequency amplifier system 14, which in turn connects to electron tube detector 15 and the audio frequency amplifier 16. The electron tube relay 17 connects to the output of audio frequency amplifier 16 and includes in its output circuit the actuating winding 18 of the relay 19. The armature 20 of relay 19 is normally maintained open by means of spring 22 and away from contact 21. However, when a signal is incident upon antenna ground system 13—13a, relay armature 20 is attracted by relay winding 18 thus closing contact 21. When there is no signal incident upon antenna ground system 13—15 relay armature 20 is not attracted and is open with respect to contact 21. The relays 9 and 19 are connected in a multiple relay circuit 23 including the indicating device 24 and battery 25 in series with armature 20, contact 21 of relay 19, and the armature 10 and contact 11 of relay 9. The indicating lamp 24 is energized only when armature 20 is closed with respect to contact 21 and at the time that armature 10 is closed with respect to contact 11. When the compass loop 1 is in a position with the axis 3 pointing toward the transmitting station, there is minmum signal in the turns of the loop 1, and relay armature 10 is closed with respect to contact 11 lighting indicator lamp 24 so long as the transmitted signal is incident upon antenna ground system 13—13a. It will be clear that if there is no signal being transmitted that the multiple relay control circuit 23 will be held open by the open circuit of armature 20 and contact 21. In this way there will be no confusion between a condition of zero signal which is the condition on which operation of the indicator lamp 24 is desired and a condition where there is no transmission. While the distant station is transmitting, relay armature 20 remains connected to contact 21 and rotation of loop 1 results in the alternate closing and opening of the contact of relay 9, resulting in the alternate lighting and extinguishing of the indicator lamp 24. When the loop 1 is turned so that its plane is perpendicular to the direction of the transmitting station, the received signals are at their minimum strength, and the energization of lamp 24 will accurately indicate this condition. However, when the loop is turned with its plane pointing in the direction of the transmitting station, the maximum signal will be received and the lamp 24 will be extinguished, enabling an accurate reading with respect to the direction of the station to be obtained. The loop receiving circuit is tuned by an adjustable system as represented by condenser 26 while the antenna ground receiving circuit is tuned by an adjustable system such as represented by condenser 27. The tuning of the separate circuits is simultaneously controlled as indicated by arrows 28 in order that the two systems may always be tuned to the same frequency.

It is understood that known arrangements will be used for preventing interaction between the circuits for avoiding antenna effect upon the directional qualities of the loop by reason of the proximity of the open antenna tuned to the same frequency.

I may employ mechanically tuned relays in the circuits of the vacuum tube relays 7 and 17, as set forth more fully in my Letters Patent No. 1,597,416, dated August 24, 1926.

The system of my invention provides an accurate visual system for indicating direction in a radio compass system. In lieu of the lamp 24, I may provide some other form of visual indicator, and while I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. A visual indicating radio compass comprising a pair of receiving channels, directive means connected to one of said channels, non-directive means connected to the other of said channels, independent control relays operated by each of said channels, a visual indicating device, and a series circuit including said visual indicating device and each of said control relays for operating said visual indicating device when said control relays are simultaneously energized.

2. In a visual indicating radio compass, a pair of signal receiving channels, a control relay in each of said channels, means for directively receiving signals on one of said channels, means for non-directively receiving signals on the other of said channels, an armature and contact system operated by each of said control relays, a visual indicating device, a source of potential, and a series circuit including said visual indicating device, said source of potential and said armatures and associated contacts in series for effecting the operation of said visual indicating device by the conjoint operation of said armatures.

3. In a visual indicating radio compass system, a pair of signal receiving channels, directive means connected to one of said signal receiving channels, non-directive means connected to the other of said signal receiving channels, a control relay in each of said signal receiving channels, an armature and contact system operable by each of said control relays, a series circuit including a visual indicator and a source of potential, the armature of one of said relays being connected to one side of said series circuit and the armature of the other of said relays being connected in series, whereby said visual indicating device is operated by the conjoint action of said relays.

4. A visual indicating radio compass comprising a pair of receiving channels, directive receiving means connected with one of said channels, non-directive receiving means connected with the other of said channels, a control relay operably connected with each of said channels, said control relays each including a spring controlled movable armature and a contact associated therewith, the armature on one of said relays being normally closed with respect to its associated contact and the armature of said other relay being normally open with respect to its associated contact, a visual indicating device, a source of potential, a series circuit including said visual indicating device and source of potential and connected at each side to the movable armatures, and a series connection between the contact members on said relays, whereby said visual indicating device is operated in accordance with the joint effects of said receiving channels.

5. A visual indicating radio compass comprising a pair of receiving channels, directive receiving means connected with one of said channels, non-directive receiving means connected with the other of said channels, a control relay operably connected with each of said channels, said control relays each including a spring controlled movable armature and a contact associated therewith, the armature of the relay connected with the directive receiving channel being normally closed, while the armature of the relay connected with the non-directive receiving channel is normally open, a visual indicating device, a source of potential, and a series circuit including said armatures and associated contacts and said visual indicating device and source of potential, whereby said visual indicating device is operated by the conjoint effects of said signal receiving channels.

6. In a visual indicating radio compass system, a directive signal receiving circuit, a non-directive signal receiving circuit, a circuit maker and breaker actuated by said directive receiving circuit, an independent circuit maker and breaker controlled by said non-directive signal receiving circuit, a responsive circuit controlled by each of said circuit maker and breakers, a visual indicating device in said responsive circuit, and means effective in response to incoming signaling energy for energizing said visual indicating device.

7. In a signal receiving system, directive receiving means, a responsive circuit connected with said directive receiving means and controllable thereby, non-directional receiving means, a separate responsive circuit connected with said non-directional receiving means, a pair of relays each including an actuating winding, an armature and a contact member, a visual indicator, a source of potential, and a series circuit interconnecting said indicator, said source and said armatures and contact members, one of said relays being connected with said first mentioned responsive circuit and the other of said relays being connected with said separate responsive circuit.

8. In a signal receiving system, a directive receiving circuit, a responsive device connected with said directive receiving circuit and operative in accordance with signaling energy receivable by moving said directive receiving means to different positions, non-directional receiving means, a responsive circuit connected with said non-directional receiving means, a pair of relays each including an actuating winding, an armature and a contact member, a visual indicator, a source of potential, and a series circuit interconnecting said indicator, said source and said armatures and contact members, one of said relays being connected with said responsive device and the other of said relays being connected with said responsive circuit.

CARLOS B. MIRICK.